United States Patent [19]

Van Cang

[11] Patent Number: 5,267,032

[45] Date of Patent: Nov. 30, 1993

[54] DEVICE FOR DETECTING TERMINATION OF CONNECTION TO A PROGRAMME TO BE PAID FOR, RECEIVED BY A SUBSCRIBER UNIT VIA AN INTERACTIVE REMOTE DISTRIBUTION NETWORK

[75] Inventor: Luc Pham Van Cang, Savigny Sur Orge, France

[73] Assignee: Thomson Consumer Electronics, Courbevoie, France

[21] Appl. No.: 603,759

[22] PCT Filed: Mar. 16, 1990

[86] PCT No.: PCT/FR90/00178

§ 371 Date: Nov. 16, 1990

§ 102(e) Date: Nov. 16, 1990

[87] PCT Pub. No.: WO90/11665

PCT Pub. Date: Oct. 4, 1990

[30] Foreign Application Priority Data

Mar. 21, 1989 [FR] France .................. 89 03672

[51] Int. Cl.⁵ ........................................ H04N 7/10
[52] U.S. Cl. ........................................ 358/86; 455/4.2; 455/6.2
[58] Field of Search ............... 358/84, 86; 455/2, 4.1, 455/4.2, 5.1, 6.2

[56] References Cited

U.S. PATENT DOCUMENTS

| | | |
|---|---|---|
| 3,580,989 | 5/1971 | Banning .................. 178/5.1 |
| 4,007,483 | 2/1977 | Van Cang .................. 358/4 |
| 4,030,120 | 6/1977 | Van Cang .................. 358/27 |
| 4,044,376 | 8/1977 | Porter .................. 358/84 |
| 4,130,433 | 12/1978 | Chomet .................. 358/84 |
| 4,207,431 | 6/1980 | McVoy .................. 179/1 MN |
| 4,408,337 | 10/1983 | Van Cang .................. 377/44 |
| 4,528,589 | 7/1985 | Block et al. .................. 358/84 |
| 4,538,268 | 8/1985 | Van Cang .................. 371/20 |
| 4,544,752 | 10/1985 | Van Cang .................. 358/210 |
| 4,554,663 | 11/1985 | Van Cang .................. 371/20 |
| 4,559,553 | 12/1985 | Van Cang .................. 358/10 |
| 4,692,759 | 9/1987 | Van Cang .................. 340/748 |
| 4,709,343 | 11/1987 | Van Cang .................. 364/724 |
| 4,710,764 | 12/1987 | Van Cang .................. 340/728 |
| 4,926,256 | 5/1990 | Manba .................. 455/5.1 |
| 4,947,244 | 8/1990 | Fenwick et al. .................. 455/5.1 |

*Primary Examiner*—Reinhard J. Eisenzopf
*Assistant Examiner*—Edward Urban
*Attorney, Agent, or Firm*—Oblon, Spivak, McClelland, Maier & Neustadt

[57] ABSTRACT

The device of the invention comprises, in the terminal (7) of each subscriber, a carrier wave generator which sends this wave to a distribution center (1) as long as the television of this terminal is operating, the absence of this wave being detected in the center by a circuit (4) which then sends a shadow channel to the subscriber. The deflecting of the subscriber's television to a source independent of the center can be done only after the sending of a shadow channel to this subscriber.

10 Claims, 2 Drawing Sheets

DEVICE FOR DETECTING TERMINATION OF CONNECTION TO A PROGRAMME TO BE PAID FOR, RECEIVED BY A SUBSCRIBER UNIT VIA AN INTERACTIVE REMOTE DISTRIBUTION NETWORK

BACKGROUND OF THE INVENTION

1. Field of the Invention

The present invention relates to a device for detecting termination of connection to a program to be paid for, received by a subscriber unit via an interactive remote distribution network.

2. Discussion of the Background

The interactive distribution by cable of video frequency signals from a distribution center, forming the head of a star network, to subscribers each provided with a terminal connected to this cable is a technique which rests upon the transmission to the distribution center of connection requests formulated remotely by the subscribers. These requests may be managed by a microcomputer controlling a switching grid capable of establishing connections between each cable beginning and each information source available in the distribution center. The request is routed to the distribution center by the connection cable cable which connects this center to the subscriber terminal and which serves mainly to transmit to the subscriber the video signals corresponding to the program selected.

The connection of the subscriber cable to the program sources may also be made in the way described in the patent application filed by the Applicant Company on the same day as the present application and entitled: "Network for interactive distribution of video, audio and telematic information". Briefly, this alternative method consists in using, in the distribution center, a switching module for each subscriber, this module containing a multiplexer with P input tracks and one output track, and a remote control receiver intended for selecting one of the P tracks carrying the programs from the information sources. In this case, the microcomputer of the distribution center samples the modules in order to find out the connection states with a view to billing the services rendered by the distribution network and, if appropriate, it proceeds authoritatively to connection changes when the subscriber makes a choice to which he is not entitled. The subscriber's request is transmitted by the cable which connects him individually to the distribution center, and the microcomputer has available the information relating to the connection established between the subscriber cable and the information source corresponding to the choice which he has expressed. This request shares the cable with the video signals without causing interference, by virtue of the use of a carrier modulated by the coded message which represents this request. This carrier has a frequency close to the frequency standard of the video signals broadcast by the remote distribution system for feeding for example a television situated at the subscriber's home or any other electronic audio, video or telematic device capable of processing these signals.

The subscriber terminal comprises a keyboard associated with a remote control emitter and with means enabling the application to the connection cable of information in a form able to be received by the corresponding equipment of the distribution center.

Among other things, the distribution center has the task of keeping an account of access to the information sources as a function of elements such as the nature of the program selected and the duration of connection and the time slot. For this purpose, it does not suffice that a connection request be executed, because since the last request the subscriber may have ceased making use of the program which is broadcast to him. The subscriber may for example be invited to formulate a request for free connection after each phase of using a program to be paid for, but he may forget to do so, in particular when he leaves the remote distribution network in order to make use of another signal source (television programs broadcast by electromagnetic waves, personal video games, etc). The equipment intended to receive the remotely distributed signals at the subscriber's home are of standard type and do..not have means of sending back to the distribution center an operating status which the latter may take into account to avoid any incorrect billing.

SUMMARY OF THE INVENTION

The subject of the present invention is a device which enables, in a remote distribution network of the type with star cabling from a distribution center, the automatic and most rapid possible detection of the termination of the connection of any subscriber to a source of programs to be paid for, this device being the least expensive possible, and the simplest possible to install.

The subject of the present invention is also a process for exempting the user of a cabled network for distributing video frequency signals, a process which enables the user, once he no longer wishes to receive programs coming from the distribution center and wishes to go over to receiving a program broadcast by electromagnetic waves, to perform this maneuver as simply as possible without risk of being billed by this center when he receives the said programs broadcast by electromagnetic waves.

The device according to the invention comprises, in the terminal of each subscriber, a carrier wave generator, a device for detecting operation of a set linked to the terminal for receiving programs, in particular those broadcast by the distribution center, a gated circuit controlled by the operation detector circuit and interposed between the carrier wave generator and the entry of the connection cable to the distribution center, and in the distribution center a device detecting the carrier wave and a freely usable program selection means controlled by this detector device.

According to another characteristic of the invention, a subscriber terminal comprises a device detecting a program signal transmitted by the distribution center, this device being connected to an inverting device establishing the priority connection between the subscriber's receiving device and the distribution center as long as the latter transmits a program to the subscriber, the distribution center being provided with a free-use shadow channel to which the subscriber must link up in order to switch the inverter with a view to picking up through the terminal program distinct from those which are able to be carried by the network.

The process for exemption according to the invention is characterized in that the exemption is related to the lasting absence of a signal exchanged between the distribution center and the user terminal, the absence causing a switching within the device of the receiving end of the signal. Advantageously, the said signal is a carrier wave characterizing by its presence the operating of a user set linked to the terminal. According to another aspect of the process of the invention, the signal corresponds to the choice for the use of a program broadcast by the network, another choice implying that the user gets himself allocated to the distribution center a free channel devoid of this signal.

BRIEF DESCRIPTION OF THE DRAWINGS

The present invention will be better understood on reading the detailed description of an embodiment taking as nonlimiting example and illustrated by the attached drawing in which.

DESCRIPTION OF THE PREFERRED EMBODIMENTS

Figure 1:
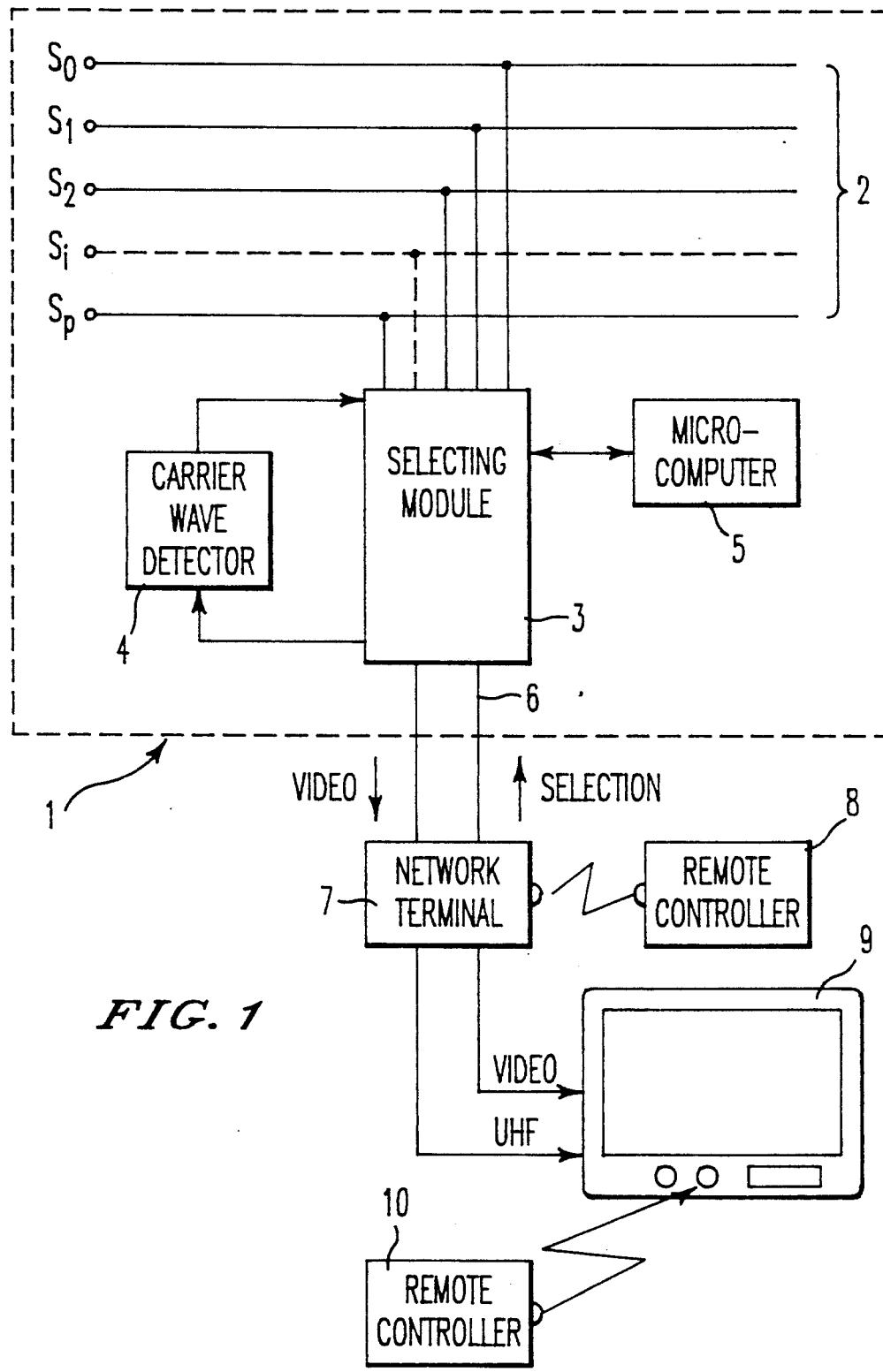
FIG. 1 is a partial block diagram of a remote distribution network equipped with a device according to the invention.

In FIG. 1 has been schematically represented a distribution center 1, which, in the present example, accords with that described in the said patent application of the Applicant Company, but which may be of another known type. The center 1 broadcasts, in particular, video programs but may just as well broadcast audio or telematic programs. This center 1 comprises essentially a bus 2 which, in what follows, will be referred to as the video bus for convenience, this bus being connected to program sources S1 to SP as well as to a shadow source S0 (a source with free use without a video signal or without a signal useful in general), and for each subscriber an amplifying and source selecting module 3. In accordance with the invention, the module 3 is connected to a carrier wave detector device 4 cooperating with the carrier wave emitter, described below, located in the corresponding subscriber's terminal. This device 4 forces the module 3 to connect up to the shadow source when it detects a carrier absence for a certain time. A microcomputer 5 ensures the management of center 1, and in particular verifies the legality of the connections obtained by the subscribers and collects the data necessary for billing.

Each module 3 is connected to the corresponding subscriber by a connection cable 6 which is, for example, a bifilar line. On the subscriber's side, the cable 6 is connected to a network terminal 7 described in detail below in relation to FIG. 2. The subscriber has an infrared remote controller 8 cooperating with an appropriate device for controlling the terminal 7 with a view to communicating its requests for connection to a specified source to the center 1 via the cable 6. The terminal 7 is connected to a program-receiving set which in the present case is a television set 9. The connection between the terminal 7 and the set 9 is made, as standard, by a video line and a UHF line, but it is of course understood that one of these lines can suffice. The subscriber also has another infrared remote controller 10 cooperating with the television 9 for the selection of programs received by electromagnetic waves and for various running adjustments of this television.

Figure 2:
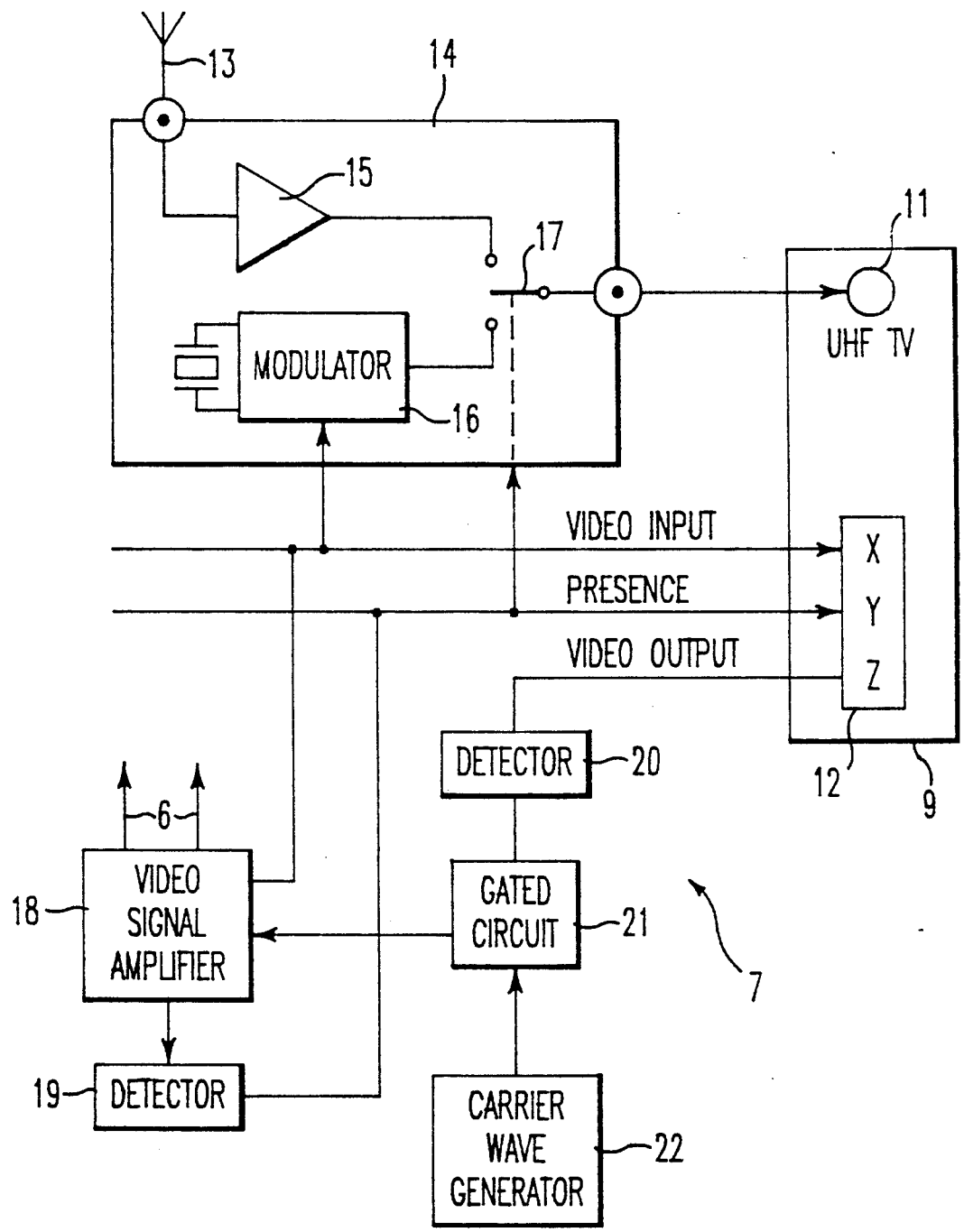
FIG. 2 is a detailed block diagram of a subscriber terminal of the network of FIG. 1.

In FIG. 2 is schematically represented the pertinent parts of the television 9, namely a UHF adaptor 11 and a "television peripherals" adaptor 12, as well as an aerial 13 picking up television programs broadcast by electromagnetic waves. The other blocks represented in FIG. 2 belong to the subscriber terminal 7 mentioned above.

The block 14 of the subscriber terminal contains an amplifier 15 connected to the aerial 13 and a modulator 16 which are alternately connected to the adaptor 11 of the television with the aid of a controlled inverter 17.

The cable 6 is connected to a composite video signal amplifier 18. This composite signal is applied at one and the same time to the modulator 16, to the video input terminal "X" of the adaptor 12 and to a video signal detection circuit 19. The circuit 19 detects the effective presence of the composite video signal arriving at the terminal 7 by detecting in a manner well known per se the pulses for synchronization of this signal. The detection signal of the circuit 19 controls the deflection of the inverter 17 and is sent to the slow speed switching terminal "Y" of the adaptor 12. Thus, so long as the circuit 19 detects the presence of a composite signal, its output signal forces the inverter 17 to link up to the modulator 16 and forces the television to connect up to the input X. It is known that the quality of the picture from a television is better when it receives a composite video signal directly than when this composite signal is modulated by a modulator then demodulated by the demodulator connected up downstream of its UHF (or VHF) adaptor. For this reason, when a television is equipped with an adaptor for television peripherals, as is the case in FIG. 2, it is preferable to send the output signals from the amplifier 18 to the terminal X of such an adaptor, and in this case the modulator 16 may be omitted.

The video output terminal "Z" of the adaptor 12 is connected to a video signal presence detection circuit 20. The circuit 20 is connected to the control input of a gated circuit 21. The circuit 21 is arranged between a circuit 22 emitting remote control signals and the amplifier 18. The circuit 22 continuously emits a carrier wave so long as the terminal 7 is operating. When the subscriber manipulates the remote controller 10 to select a program from the center 1, a modulation of the carrier wave occurs. Preferably, this modulation consists of a sequence of brief interruptions of the carrier (negative modulation). As a variant, or if the television is not equipped with an adaptor for television peripherals, the circuit 20 may detect the effective operating of the television in any other way, for example by picking up the current supplying the television.

With the terminal 7 operating, so long as the circuit 19 detects the presence of a video signal coming from the center 1, the inverter 17 cannot be connected to the amplifier 15 and the television receives this signal (either via the modulator 16 if there is no adaptor 12, or via the terminal X). Moreover, since the television receives this signal, the circuit 21 is passing and the carrier of the circuit 22 reaches the detector 4 of the center 1. The distribution center therefore bills the subscriber with the program received.

Once the subscriber no longer wishes to receive programs combing from the distribution center and wishes to go over to receiving a program broadcast by electromagnetic waves, he can do so only by requesting of the distribution center the connection up to a shadow channel. In fact, the inverter 17 cannot deflect towards the amplifier 15 (or towards any other source independent of the center 1) except when the amplifier 18 no longer receives any video signal from the distribution center 1, the detector circuit 19 then freeing the inverter 17 alone. Of course, the microcomputer of the distribution center then detects the connection of the subscriber's module to a shadow source and stops forthwith the charging of the subscriber. Similarly, when the subscriber turns off the television, or when this television breaks down, the detector 20 blocks the circuit 21, the carrier of the circuit 22 no longer reaches the center 1 and a shadow channel is assigned to the subscriber.

I claim:

1. A system for detecting connection between an interactive remote distribution network and a subscriber unit, comprising:

a distribution center for distributing program signals to be paid for and a free-use shadow signal;

at least one subscriber unit for receiving signals distributed by the distribution center, each subscriber unit comprising:

a first input for receiving signals distributed from the distribution center;

a second input for receiving program signals from a second input source;

a detector circuit for detecting whether a program signal to be paid for or the free-use shadow channel is being received;

a receiver for receiving signals from the first and second inputs;

a device for detecting operation of the receiver;

a switch for determining whether the receiver receives signals from the first input or the second input, wherein the switch connects the receiver to the second input when the detector circuit detects the free-use shadow channel being received.

2. The system according to claim 1, wherein each subscriber unit further comprises:

a carrier wave generator for generating a carrier wave to be transmitted back to the distribution center;

a gated circuit for receiving the carrier wave and transmitting the carrier wave back to the distribution center, the gated circuit blocking transmitting the carrier wave to the distribution center at least when the device for detecting operation of the receiver detects that the receiver is not operating.

3. The system according to either one of claims 1 or 2, wherein the receiver is a television set.

4. The system according to claim 3, wherein the carrier wave transmits a remote control signal by negative modulation.

5. The system according to either one of claim 9 or 2, wherein the carrier wave transmits a remote control signal by negative modulation.

6. A method for detecting connection between an interactive remote distribution network and a subscriber unit, comprising the steps of:

distributing program signals to be paid for and a free-use shadow signal from a distribution center;

receiving signals distributed by the distribution center by at least one subscriber unit, each subscriber unit performing the steps of:

receiving signals from the distribution center at a first input;

receiving program signals from a second input source at a second input;

detecting whether a program signal to be paid or the free-use shadow channel is being received;

receiving signals from the first and second inputs at a receiver;

detecting operation of the receiver of the signals from the first and second inputs; and determining whether the receiver receives signals from the first input or the second input, and whether a switch connects the receiver to the second input when the detector circuit detects the free-use shadow channel being received.

7. The system according to claim 6, wherein each subscriber unit further comprise performing the steps of:

generating a carrier wave to be transmitted back to the distribution center;

receiving the carrier wave in a gated circuit and transmitting the carrier wave back to the distribution center, the gated circuit blocking transmitting the carrier wave to the distribution center at least when the device for detecting operation of the receiver detects that the receiver is not operating.

8. The system according to either one of claim 6 or 7, wherein the receiver is a television set.

9. The system according to claim 8, wherein the carrier wave transmits a remote control signal by negative modulation.

10. The system according to either one of claims 6 or 7, wherein the carrier wave transmits a remote control signal by negative modulation.

* * * * *